(12) United States Patent
Mendoza

(10) Patent No.: US 11,491,615 B2
(45) Date of Patent: Nov. 8, 2022

(54) THREADED INSERT REMOVAL TOOL WITH TORQUE MULTIPLIER

(71) Applicant: Raul Mendoza, Houston, TX (US)

(72) Inventor: Raul Mendoza, Houston, TX (US)

( * ) Notice: Subject to any disclaimer, the term of this patent is extended or adjusted under 35 U.S.C. 154(b) by 303 days.

(21) Appl. No.: 17/002,738

(22) Filed: Aug. 25, 2020

(65) Prior Publication Data

US 2022/0063065 A1 Mar. 3, 2022

(51) Int. Cl.
*B25B 17/02* (2006.01)
*E21B 41/00* (2006.01)
*B25B 23/00* (2006.01)

(52) U.S. Cl.
CPC .......... *B25B 17/02* (2013.01); *B25B 23/0007* (2013.01); *B25B 23/0071* (2013.01); *E21B 41/00* (2013.01)

(58) Field of Classification Search
CPC . B25B 17/02; B25B 23/0007; B25B 23/0071; E21B 41/00
See application file for complete search history.

(56) References Cited

U.S. PATENT DOCUMENTS

2019/0344408 A1* 11/2019 Kane .................. B25B 23/0007

* cited by examiner

*Primary Examiner* — David B. Thomas
(74) *Attorney, Agent, or Firm* — Law Office of Craig Bohn; Craig E. Bohn

(57) ABSTRACT

A method and device for rotational disconnection a nozzle from a valve body, to include transferring torque applied to an input adapter, through a gear system, to a rotational, self-centering chuck, with a plurality of jaws to secure a nozzle threadedly secured within a valve body, and an anchor tower extending from the base of the tool in the same direction as the tool that is positioned for nozzle release, so that the anchor tower may provide rotational fixation of the valve body while torque is applied to the nozzle, along with a manner to employ coordinatedly sized and positioned gears, which in combination multiply the leverage force or torque input into the tool for application to the rotational disconnection effort.

13 Claims, 4 Drawing Sheets

THREADED INSERT REMOVAL TOOL WITH TORQUE MULTIPLIER

BACKGROUND OF THE INVENTION

The present invention generally relates to methods and devices for separating threaded metal parts, and more specifically employing geared mechanical advantage to increase the rotational pneumatic, impact, or manual force to separate treaded oilfield drilling components.

SUMMARY OF THE INVENTION

Many components of drilling pipe, casings, and valves are threadedly connected. To ensure against unexpected disconnection and leaks, great pressure may be applied to threaded connections. Disassembly of components may be extremely difficult, especially when small elements become rigidly threaded into recessed receiver connections. One such situation where this may happen is where an inlet nozzle is securely seated within a pressure safety valve, with only a small portion of the inlet nozzle protruding from the valve body.

It would be an improvement to the prior art to provide a simple and relatively compact tool, for portability in an over-the-road service truck, and powerable by a handheld pneumatic, impact, or manual lever tool, for use in the field. It would be an additional improvement to the art for the tool to employ gears that in combination multiply the leverage force or torque inputted into the tool for application to the rotational disconnection effort.

DESCRIPTION OF THE PREFERRED EMBODIMENT

Figure 1:
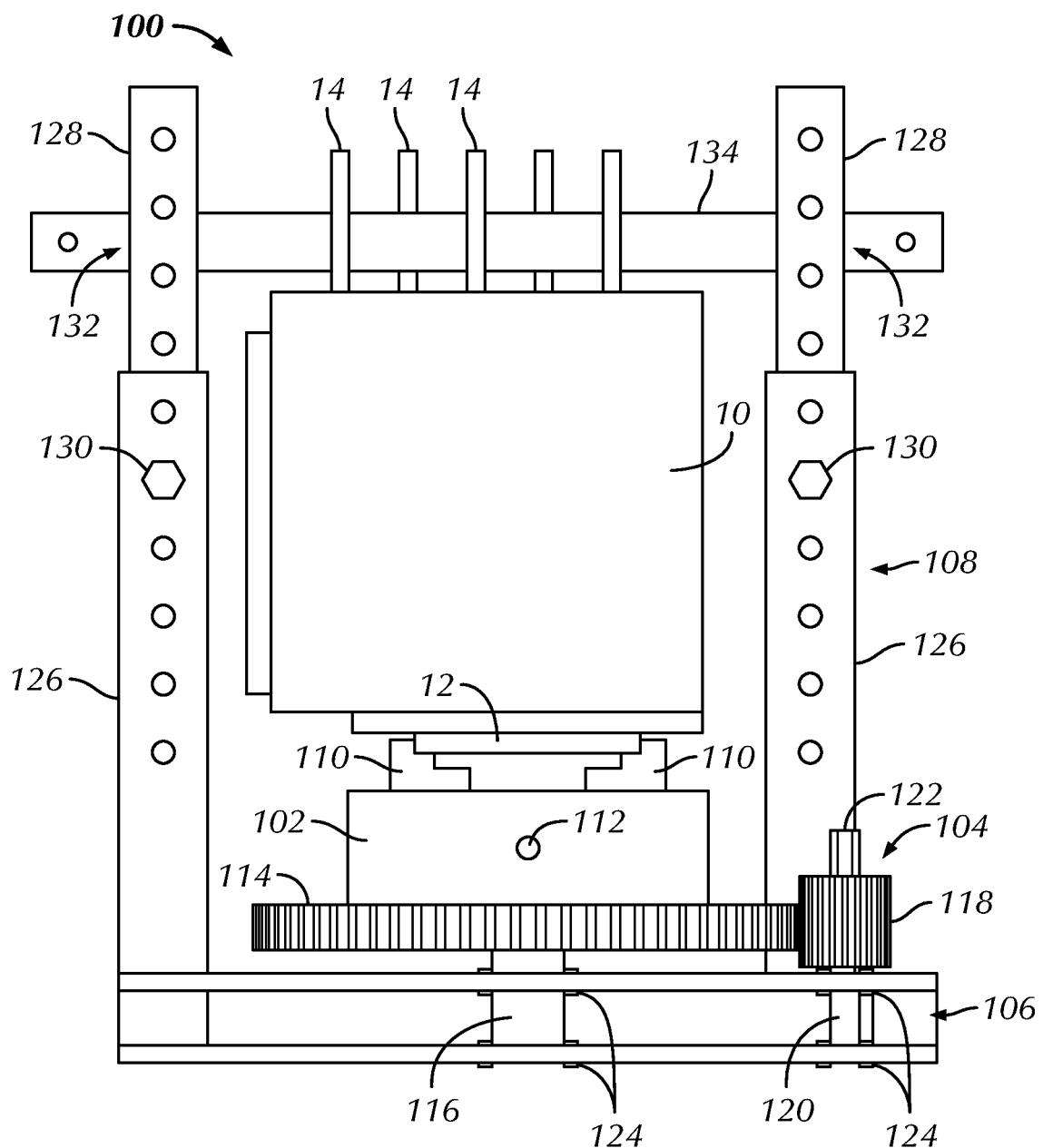
FIG. 1 is a schematic illustration of an exemplary tool of the present invention engaged with an exemplary joined pressure safety valve and nozzle.
Figure 2:
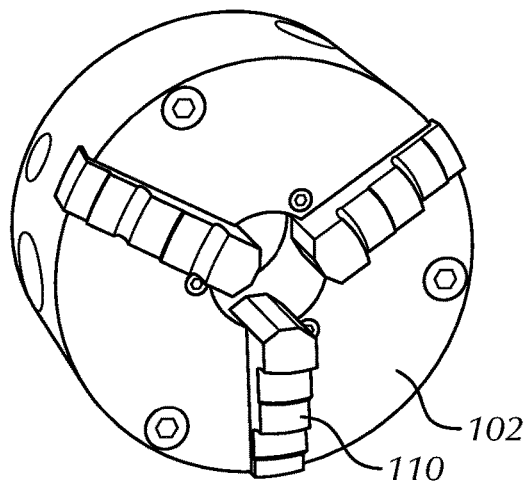
FIG. 2 is a perspective illustration of an exemplary 3-jawed chuck employable in the present invention.
Figure 3:
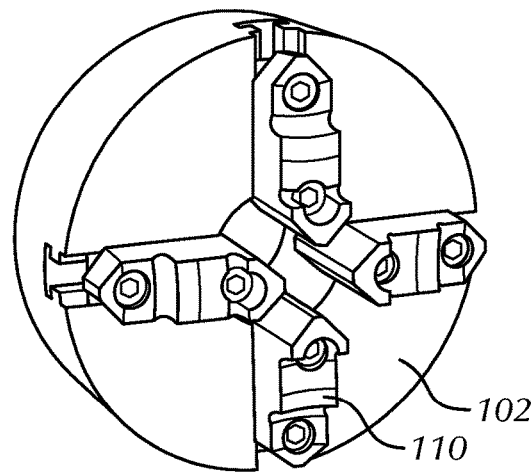
FIG. 3 is a perspective illustration of an exemplary 4-jawed chuck employable in the present invention.
Figure 4:
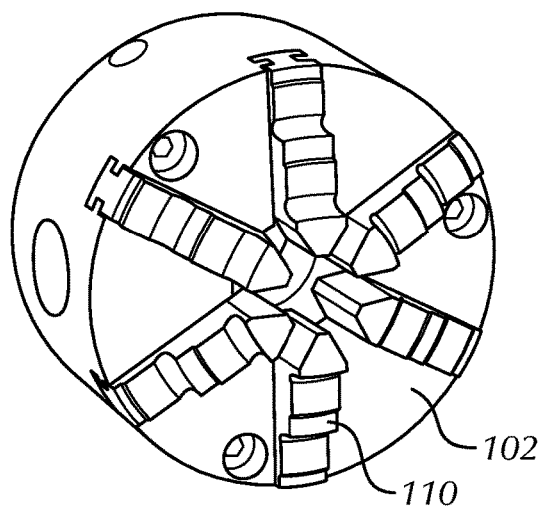
FIG. 4 is a perspective illustration of an exemplary 6-jawed chuck employable in the present invention.
Figure 5:
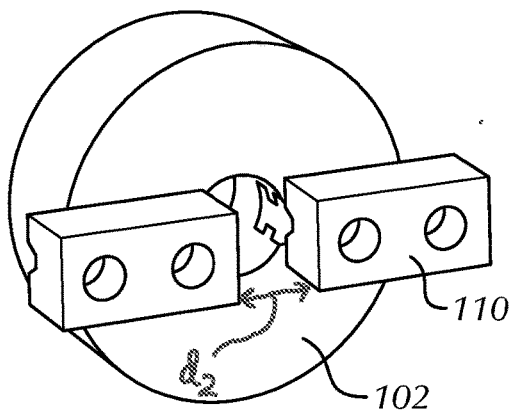
FIG. 5 is a perspective illustration of an exemplary 2-jawed chuck employable in the present invention.

Referring now to FIG. 1, an exemplary torque transfer tool 100 is shown engaged with a valve body 10, in which a nozzle 12 is threadedly seated. The exemplary torque transfer tool 100 may have a base 106, supporting a gear system 104, connected to a self-centering chuck 102. The base 106 may also support a rotational fixation system 108, used to hold the valve 10 in a rotationally fixed position, while the chuck 102 and gear system 104 rotationally disengage the nozzle 12 from the valve 10. In the exemplary embodiment, valve 10 also has a plurality of assembly bolts 14 that protrude from the valve body 10 opposite the nozzle 12. The exemplary embodiment of torque transfer tool 100 has an integral rotational fixation system 108, which in the exemplary embodiment is an anchoring tower 108.

In the exemplary embodiment, the gear system 104 may be mounted on the base 106, with an input gear 118 on an input gear shaft 120, and an exemplary main gear 114 on a main gear shaft 116. Each exemplary main gear shaft 116 and input gear shaft 120 may be rotatably secured to the base 106 with bearings 124. In the exemplary embodiment, chuck 102 is operatively attached to the shaft 116 of the main gear 114 at a chuck adapter 115, opposite the base 106. In the exemplary embodiment, gear system 104 operatively positioned between multiple layers of steel forming the base 106.

The jaws 110 extend outwardly from the chuck 102 opposite the main gear 114 so as to be able to receive a nozzle 12. In the exemplary embodiment, the exemplary chuck 102 may have a plurality of jaws 110 positioned to engage the nozzle 12, and a jaw tightener 112, which permits the operator to tighten the jaws 110 securely and uniformly around the circumference of the exposed portion of the nozzle 12. When a chuck 102 is securely attached to a nozzle 12 by the jaws 110, the jaws 110 have a gripping diameter $d_2$ equal to the diameter of the exposed portion of the nozzle 12. The jaws 110 may open further than the gripping diameter $d_2$, and then be closed onto the nozzle 12 to obtain a secure attachment. Various forms and designs of chucks are known in the field of art. One distinct difference may be the number of jaws 110 the chuck possesses.

Referring briefly to FIGS. 2, 3, 4, and 5, four examples are shown. A person skilled in the art of chuck usage may be able to determine the most suitable configuration for appropriate engagement with a particular nozzle 12. The exemplary embodiment tool 100 employs a 3-jaw chuck.

In the exemplary embodiment, an input adapter 122 is configured opposite input gear shaft 120 from input gear 118. The exemplary input adapter 122 may be configured to receive standard torque tools, such as a pneumatic driver, impact tool, or a socket and breaker bar combination, to name a couple examples. In the exemplary embodiment, where the input gear 118 is in direct contact with the main gear 114, and operator would need to apply torque to the input adapter 122 in an opposite direction to the rotation desired in the main gear 114. In the exemplary embodiment, since the tool to apply torque will approach the gear system 104 from the same side as the nozzle 12, the input gear 118 will need to be rotated counterclockwise, from the perspective of the torque tool, in order to appropriately rotate the main gear 114 and chuck 102 to threadedly loosen the nozzle 12 from the valve 10. One skilled in the art may appreciate that some torque tools have an inherent mechanical disadvantage when rotating counterclockwise. This disadvantage will be addressed and overcome in a subsequent exemplary embodiment.

In the exemplary embodiment, anchoring tower 108 may be comprised of a plurality of upright tower bases 126 protruding upwardly from the base 106. The exemplary tower bases 126 extend in the same direction as a valve 10 upon which the tool is to be used. Anchoring tower 108 may provide a structure to bind against a valve body 10 to prevent rotation of the valve body 10 while torque is being applied to the seated nozzle 12. In the exemplary embodiment, each upright bass 126 may have a tower extender 128 that may engage the upright bass 126 and extend further there from. A tower bolt 130 may be used in each combination of tower base 126 and tower extender 128 to secure their extended position with respect to each other. In the exemplary embodiment, the extended position may be adjusted to accommodate valves 10 of varied sizes.

In the exemplary embodiment, each tower extender 128 may have an extender cross hole 132 oriented so as to align in pairs across a valve 10 positioned within the torque transfer tool 100 for nozzle 12 removal. In the exemplary embodiment, a tower crossbar 134 may be positioned within a pair of extender cross holes 132 so as to engage valve 10 assembly bolts 14. With the tower crossbar 134 rigidly connected to the anchoring tower 108 and engaged with the assembly bolts 14 of the valve 10, the valve 10 will be prevented from rotating when torque is applied to the nozzle 12.

Figure 6:
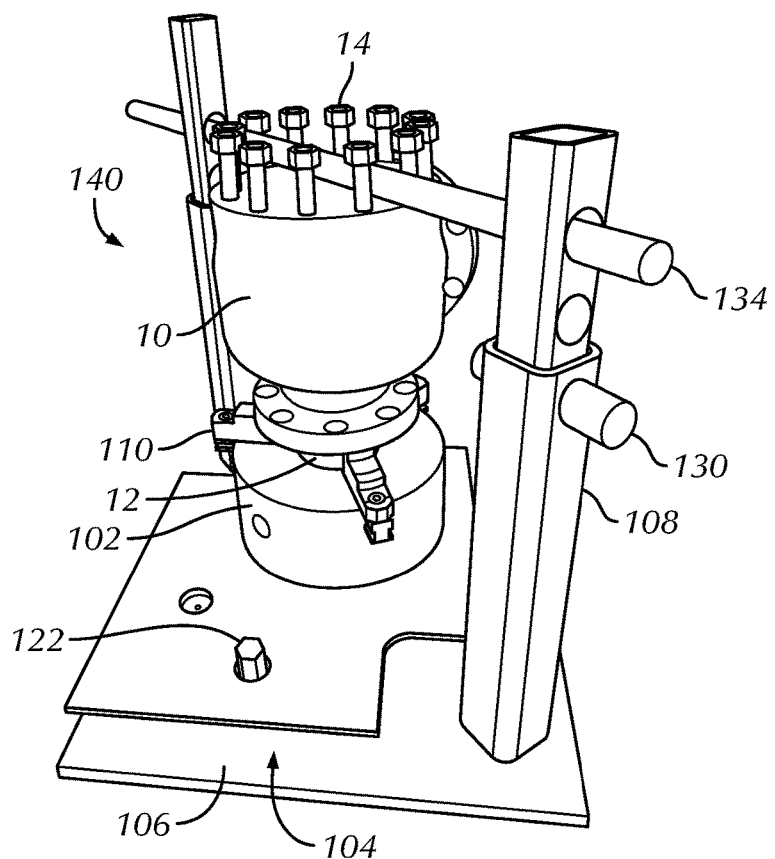
FIG. 6 is an oblique illustration of an exemplary embodiment of a tool according to the present disclosure, which employs multiple gears, engaged with an exemplary joined pressure safety valve and nozzle.
Figure 7:
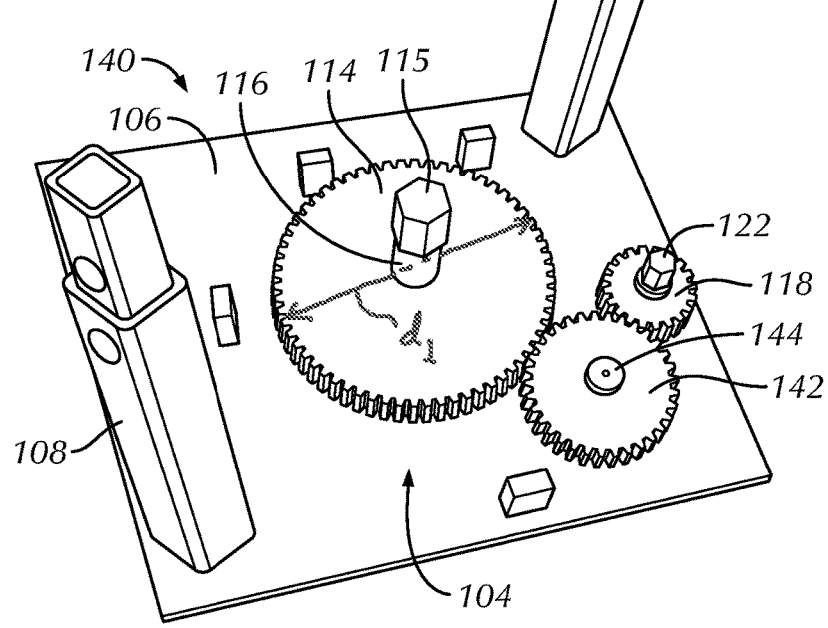
FIG. 7 is an oblique illustration of the tool of FIG. 6, partially disassembled.

Referring now primarily to FIGS. 6 and 7, an alternate exemplary embodiment torque transfer tool 140 is shown, which may employ multiple gears in order to adjust the mechanical advantage provided by gear system 104, and/or to modify the torque input direction required on input gear 118. In FIG. 7, the top steel plate of base 106 is removed to show the detail of gear system 104. Through selective coordination of gears in gear system 104, the optimal torque range and torque direction, which may help overcome directional disadvantages of some torque tools. In the exemplary embodiment, in addition to main gear 114 on main gear shaft 116, and input gear 118 from which input adapter 122 extends, an intermediate gear 142 on an intermediate gear shaft 144 may be positioned to engage, in series, both input gear 118 and main gear 114. Exemplary chuck adapter 115 is shown at an end of main gear shaft 116, and may be configured to receive engage a variety of forms and designs of chucks 102 to impart rotation of the main gear shaft 116 to the chuck 102.

Figure 8:
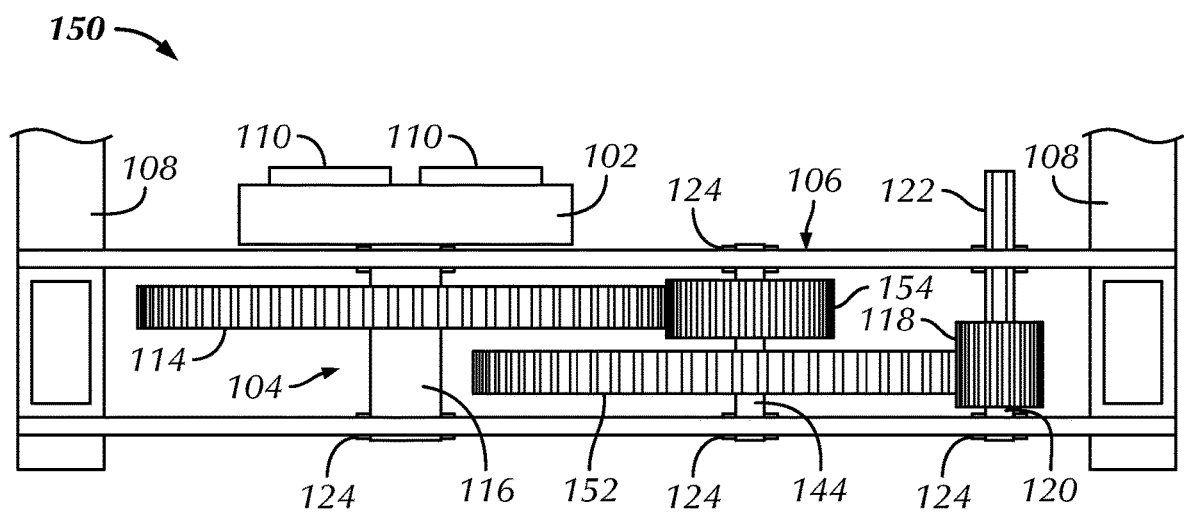
FIG. 8 is a schematic partial illustration of an alternate exemplary tool according to the present disclosure, which employs a tandem gear arrangement.

Referring now primarily to FIG. 8, an exemplary torque enhancing tandem gear torque transfer system 150 is shown. In the exemplary embodiment, the intermediate gear shaft 144 may possess both a larger intermediate input gear 152 and a smaller intermediate transfer gear 154. The precise size of the main gear 114, input gear 118, larger intermediate input gear 152, and smaller intermediate transfer gear 154 may be chosen in order to achieve the desired torque to be applied to chuck 102 based on the torque tool anticipated to be imparting torque to the input adapter 122. In the exemplary torque enhancing tandem gear torque transfer system 150, the combination of the larger intermediate input gear 152 driving the common intermediate shaft 144, and therefore the smaller intermediate transfer gear 154, results in an increase in the torque being delivered to main gear 114. Similarly, the diameter $d_1$ of the main gear 114 may be larger with respect to the diameter of chuck 102, and more specifically the gripping diameter $d_2$ of the jaws 110. The differential in size also offers a potential for increase in the torque that may be transferred through the chuck 102 to an attached nozzle 12. In this fashion, the torque delivered to input adapter 122 may be greatly increased by the time the force is imparted to the nozzle 12 from chuck 102. As in torque transfer system 140, this torque transfer system 150 provides multiple gears arranged to adjust the mechanical advantage gained from the torque input adapter 122 to the chuck adapter 115.

In the exemplary embodiment, main gear 114, which is co-mounted on main gear shaft 116 with the chuck 102 may have a larger diameter $d_1$ than the gripping diameter $d_2$ of the chuck 102 to provide an additional opportunity for mechanical torque advantage.

The gear system 104 works as a gear reduction system or transmission, where the force applied to the input adapter 122 may be multiplied by the desired combination of gear sizes working in conjunction. When appropriately configured, an application that may require about 3500 to around 7100 foot-pounds of torque may be achieved by a socket and breaker bar combination receiving input force from a human operator. Similarly, lightly powered pneumatic tools or impact tool may be made effective for the task of loosening a nozzle 12 from a valve 10 with an appropriate torque enhancing tandem gear torque transfer system 150.

Alternative embodiments of the torque transfer tool 100 may rely on an alternate rotational fixation system 108 to hold the valve 10 in a rotationally fixed position, while the chuck 102 and gear system 104 rotationally disengage the nozzle 12 from the valve 10. Such alternate rotational fixation systems 108 may include a vice secured to a rigid surface configured to place the torque transfer tool 100 in a functionally adjacent position. An additional alternate rotational fixation systems 108 may include a rigid bar or pipe for use as a lever that can be bound against features of the valve 10 and a fixed structure functionally adjacent to the torque transfer tool 100, such as a wall or heavy piece of equipment. An additional alternate rotational fixation systems 108 may include an extremely large pipe wrench, capable of gripping the valve 10, or a rigid feature of the valve 10, an prevent rotational movement. Given this disclosure, others forms of rotational fixation systems 108 by be conceived of by one of ordinary skill in the art, and may fall under claims allowed for the torque transfer tool 100.

The examples and descriptions contained in this specification are merely possible implementations of the current development, and alternatives may still fall within the scope of the allowed claims. The present invention should only be limited by the following claims and their legal equivalents, since the provided exemplary embodiments are only examples of how the invention may be employed and are not exhaustive.

I claim:

1. A torque transfer tool for removing a nozzle threadedly seated within a valve body comprising:
   a base supporting a gear system;
   the gear system having a torque input adapter for operationally engaging a rotational force tool;
   a chuck adapter configured to operationally engage a chuck securely attachable to the nozzle;
   the gear system configured to communicate the rotational force from the input adapter through a plurality of gears to the chuck adapter; and
   a rotation fixation system configured to engage the valve body;
   the rotation fixation system comprising an anchor tower.

2. The tool of claim 1 further comprising:
   the anchor tower secured to and extending outwardly from the base, generally parallel to a valve body in a secured position within the tool; and
   the anchor tower having an upright base and a tower crossbar supportable by the upright base and engageable with the valve body in a secured position within the tool to prevent rotational motion of the valve body.

3. The tool of claim 1 wherein the chuck having a plurality of jaws with which to securely attach to the nozzle.

4. The tool of claim 1 wherein the gear system comprises multiple gears arranged to create mechanical advantage from the torque input adapter to the chuck adapter.

5. The tool of claim 4 wherein the gear system comprises at least one larger intermediate input gear mounted on a common intermediate shaft with a smaller intermediate transfer gear, the larger intermediate input gear operatively connected to receive input force delivered to the input adapter, and the smaller intermediate transfer gear operatively connected to deliver force to the chuck adapter.

6. The tool of claim 4 further comprising:
the chuck having a plurality of jaws with which to securely attach to the nozzle;
a main gear and the chuck adapter operatively attached to a main shaft;
the main gear having a diameter and the chuck having a gripping diameter; and
the diameter of the main gear being larger than the gripping diameter.

7. A torque transfer tool for removing a nozzle threadedly seated within a valve body comprising:
a base supporting a gear system;
the gear system having a torque input adapter for operationally engaging a rotational force tool;
a chuck adapter configured to operationally engage a chuck securely attachable to the nozzle;
the gear system configured to communicate the rotational force from the input adapter through a plurality of gears to the chuck adapter; and
a rotation fixation system configured to engage the valve body.

8. The tool of claim 7 wherein the rotation fixation system comprising an anchor tower.

9. The tool of claim 8 further comprising:
the anchor tower having an upright base secured to and extending outwardly from the base, generally parallel to a valve body with the valve body in a secured position within the tool; and
the anchor tower having a tower crossbar supportable by upright base and engageable with the valve body in a secured position within the tool to prevent rotational motion of the valve body.

10. The tool of claim 7 wherein the chuck having a plurality of jaws with which to securely attach to the nozzle.

11. The tool of claim 7 wherein the gear system comprises multiple gears arranged to create mechanical advantage from the torque input adapter to the chuck adapter.

12. The tool of claim 11 wherein the gear system comprises at least one larger intermediate input gear mounted on a common intermediate shaft with a smaller intermediate transfer gear, the larger intermediate input gear operatively connected to receive input force delivered to the input adapter, and the smaller intermediate transfer gear operatively connected to deliver force to the chuck adapter.

13. The tool of claim 7 further comprising:
the chuck having a plurality of jaws with which to securely attach to the nozzle;
a main gear and the chuck adapter operatively attached to a main shaft;
the main gear having a diameter and the chuck having a gripping diameter; and
the diameter of the main gear being larger than the gripping diameter.

\* \* \* \* \*